United States Patent
Nakajima et al.

(10) Patent No.: US 12,152,114 B2
(45) Date of Patent: Nov. 26, 2024

(54) ETHYLENE-VINYL ALCOHOL COPOLYMER RESIN COMPOSITION, FILM, AND MULTILAYER STRUCTURE

(71) Applicant: Mitsubishi Chemical Corporation, Tokyo (JP)

(72) Inventors: Takuya Nakajima, Tokyo (JP); Yoshihiro Nakai, Tokyo (JP); Keisuke Takeshita, Tokyo (JP); Kenji Kudo, Tokyo (JP); Tomoyuki Yamamoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 570 days.

(21) Appl. No.: 17/564,602

(22) Filed: Dec. 29, 2021

(65) Prior Publication Data

US 2022/0119605 A1    Apr. 21, 2022

Related U.S. Application Data

(63) Continuation of application No. PCT/JP2020/030357, filed on Aug. 7, 2020.

(30) Foreign Application Priority Data

| Aug. 9, 2019 | (JP) | 2019-147753 |
| Aug. 9, 2019 | (JP) | 2019-147756 |
| Nov. 29, 2019 | (JP) | 2019-216941 |

(51) Int. Cl.
| C08L 23/08 | (2006.01) |
| C08F 216/06 | (2006.01) |
| C08J 5/18 | (2006.01) |
| C08K 5/098 | (2006.01) |
| C08K 5/56 | (2006.01) |
| C08L 29/04 | (2006.01) |

(52) U.S. Cl.
CPC ............ C08J 5/18 (2013.01); C08F 216/06 (2013.01); C08K 5/098 (2013.01); C08K 5/56 (2013.01); C08L 23/0861 (2013.01); C08L 29/04 (2013.01); *C08F 2800/10* (2013.01); *C08J 2329/04* (2013.01); *C08J 2329/06* (2013.01)

(58) Field of Classification Search
None
See application file for complete search history.

(56) References Cited

U.S. PATENT DOCUMENTS

| 4,864,002 A * | 9/1989 | Schuetz | C08L 25/08 |
| | | | 525/239 |
| 2003/0054219 A1 | 3/2003 | Won et al. | |
| 2014/0363661 A1 | 12/2014 | Kaminaga et al. | |
| 2015/0299496 A1 | 10/2015 | Oosaki et al. | |
| 2017/0183426 A1 * | 6/2017 | Kawai | B32B 27/302 |
| 2017/0253721 A1 | 9/2017 | Yoshida | |
| 2017/0267851 A1 * | 9/2017 | Yamakoshi | B29B 9/12 |
| 2018/0355146 A1 * | 12/2018 | Nakashima | B29B 9/12 |
| 2019/0248115 A1 * | 8/2019 | Igarashi | B32B 1/00 |
| 2019/0256700 A1 | 8/2019 | Hashimoto et al. | |
| 2020/0172712 A1 | 6/2020 | Komuro | |

FOREIGN PATENT DOCUMENTS

| CN | 104136219 A | 11/2014 |
| CN | 104837913 A | 8/2015 |
| CN | 107000259 A | 8/2017 |
| JP | 2004-91521 A | 3/2004 |
| JP | 2004-323787 A | 11/2004 |
| JP | 2012-87215 A | 5/2012 |
| JP | 2020-164866 A | 10/2020 |
| WO | WO 2016/088862 A1 | 6/2016 |
| WO | WO 2018/088347 A1 | 5/2018 |
| WO | WO 2019/083000 A1 | 5/2019 |

OTHER PUBLICATIONS

Supplementary ESR for EP App. No. 20852284.7, dated Aug. 4, 2022.
Office Action dated May 7, 2024 issued in Japanese patent application No. 2021-539265, with English machine translation thereof.
Office Action for CN App. No. 202080044739.6, dated Nov. 16, 2022 (w/ translation).
Office Action for TW App. No. 109126795, dated Nov. 9, 2023 (w/ translation).
ISR for PCT/JP2020/030357, dated Oct. 20, 2020.
IPRP for PCT/JP2020/030357, dated Oct. 20, 2020 (translation).

\* cited by examiner

*Primary Examiner* — Richard A. Huhn
(74) *Attorney, Agent, or Firm* — GREENBLUM & BERNSTEIN, P.L.C.

(57) ABSTRACT

An ethylene-vinyl alcohol copolymer resin composition containing an ethylene-vinyl alcohol copolymer and a metal compound, and having a peak at $2\theta=2$ to $15°$ when measured by wide-angle X-ray diffraction using CuKα ray, as an ethylene-vinyl alcohol copolymer resin composition having an excellent gas barrier property in a high humidity environment, particularly an excellent oxygen barrier property in a high humidity environment.

6 Claims, No Drawings

ETHYLENE-VINYL ALCOHOL COPOLYMER RESIN COMPOSITION, FILM, AND MULTILAYER STRUCTURE

RELATED APPLICATIONS

This application is a continuation of International Application No. PCT/JP2020/030357, filed on Aug. 7, 2020, which claims priority to Japanese Patent Application Nos. 2019-147753 and 2019-147756, filed on Aug. 9, 2019, and Japanese Patent Application No. 2019-216941, filed on Nov. 29, 2019, the entire contents of each of which being herein incorporated by reference.

TECHNICAL FIELD

The present disclosure relates to an ethylene-vinyl alcohol copolymer resin composition and, more particularly, to an ethylene-vinyl alcohol copolymer resin composition which can be used for formation of a film having a higher gas barrier property in a high humidity environment.

BACKGROUND ART

Ethylene-vinyl alcohol copolymers are excellent in transparency, a gas barrier property against oxygen and the like, aroma retention, solvent resistance, oil resistance, mechanical strength and the like, and are molded into films, sheets, bottles and the like, and are widely used as various packaging materials such as food packaging materials, pharmaceutical packaging materials, industrial chemical packaging materials, agricultural chemical packaging materials and the like.

However, since the ethylene-vinyl alcohol copolymer has a relatively active hydroxyl group in the molecule, it is greatly affected by humidity, and its gas barrier property is remarkably lowered in a high humidity environment.

As an ethylene-vinyl alcohol copolymer film having an enhanced gas barrier property of an ethylene-vinyl alcohol copolymer, PTL 1 discloses an ethylene-vinyl alcohol copolymer film obtained by uniformly dispersing an inorganic compound in an ethylene-vinyl alcohol copolymer.

Further, PTL 2 discloses an ultraviolet shielding film having excellent transparency obtained by adequately dispersing zinc oxide ultrafine particles in an ethylene-vinyl alcohol copolymer.

RELATED ART DOCUMENTS

Patent Documents

PTL 1: International Publication WO2016/088862
PTL 2: JP-A-2004-91521

SUMMARY

However, in the film disclosed in PTL 1 above, a gas barrier property is improved by dispersing an inorganic compound in an ethylene-vinyl alcohol copolymer, but the gas barrier property in a high humidity environment is not sufficient, and a further improvement is required.

Further, although PTL 2 provides a film containing zinc oxide ultrafine particles in an ethylene-vinyl alcohol copolymer, it is not an issue to improve a gas barrier property in a high humidity environment, and therefore, the gas barrier property in a high humidity environment is insufficient, and a further improvement is required.

Therefore, the present disclosure under such a background provides an ethylene-vinyl alcohol copolymer resin composition excellent in a gas barrier property in a high humidity environment, particularly excellent in an oxygen barrier property in a high humidity environment.

Then, the present inventors have found that an ethylene-vinyl alcohol copolymer resin composition containing a metal compound and having a peak of X-ray diffraction at $2\theta=2$ to $15°$ when measured by wide-angle X-ray diffraction using CuKα ray is excellent in a gas barrier property in a high humidity environment.

That is, in the first aspect, the present disclosure is an ethylene-vinyl alcohol copolymer resin composition comprising an ethylene-vinyl alcohol copolymer and a metal compound, wherein the ethylene-vinyl alcohol copolymer resin composition has a peak of X-ray diffraction at $2\theta=2$ to $15°$ when measured by wide-angle X-ray diffraction using CuKα ray.

Further, the present disclosure provides in the second aspect a film containing the ethylene-vinyl alcohol copolymer resin composition of the first aspect, and in the third aspect a multilayer structure having at least one layer composed of the film of the second aspect.

The ethylene-vinyl alcohol copolymer resin composition of the present disclosure contains an ethylene-vinyl alcohol copolymer and a metal compound, and has a peak of X-ray diffraction at $2\theta=2$ to $15°$ when measured by wide-angle X-ray diffraction using CuKα ray. When ethylene-vinyl alcohol copolymer molecules or water molecules are present around this compound having a diffraction peak, the ethylene-vinyl alcohol copolymer interacts at the molecular level, and resultantly, the film composed of the ethylene-vinyl alcohol copolymer resin composition has an excellent gas barrier property, particularly an excellent oxygen barrier property in a high humidity environment.

When the metal compound is present in an amount of 0.01 to 10 parts by weight on a metal basis based on 100 parts by weight of the ethylene-vinyl alcohol copolymer, a gas barrier property, particularly an oxygen barrier property in a high humidity environment is more excellent when formed into a film.

When the metal compound comprises at least one metal selected from Zn, Co, and Ni, a gas barrier property, particularly an oxygen barrier property in a high humidity environment can be more excellent when formed into a film.

The film comprising the ethylene-vinyl alcohol copolymer resin composition of the present disclosure can be excellent in a gas barrier property, particularly an oxygen barrier property in a high humidity environment.

When the film has an oxygen permeability of not greater than 15 cc·20 μm/m²·day·atm at 20° C. at 90% RH, a gas barrier property, particularly an oxygen barrier property in a high humidity environment can be more excellent.

The multilayer structure having at least one layer comprising the film can be excellent in a gas barrier property, particularly an oxygen barrier property in a high humidity environment.

DESCRIPTION OF EMBODIMENTS

Hereinafter, embodiments for carrying out the present disclosure will be specifically described, but the present disclosure is not limited thereto.

Further, in the present disclosure, "the ethylene-vinyl alcohol copolymer" is referred to as "EVOH" in some cases.

<EVOH Resin Composition>

The EVOH resin composition of the present disclosure contains EVOH and a metal compound.

Further, since the EVOH resin composition of the present disclosure is excellent in a gas barrier property, particularly an oxygen barrier property in a high humidity environment, the composition has the main peak of X-ray diffraction at $2\theta=2$ to $15°$ when measured by wide-angle X-ray diffraction using CuK$\alpha$ ray. Furthermore, it is preferable to have the main peak at $2\theta=2$ to $9°$, and it is particularly preferable to have the main peak at $2\theta=3$ to $8°$.

It is guessed that in the present disclosure, the compound having the main peak of X-ray diffraction at $2\theta=2$ to $15°$ when measured by wide-angle X-ray diffraction using CuK$\alpha$ ray and EVOH interact to increase the polarity of EVOH, leading to the effect of an excellent oxygen barrier property in a high humidity environment.

Further, the compound having the main peak of X-ray diffraction at $2\theta=2$ to $15°$ is preferably a peak derived from the metal compound.

Note that the wide-angle X-ray diffraction is measured under the following conditions.

[Measurement Conditions]

Equipment used: D8 DISCOVER (manufactured by Bruker Japan)
Detector: 2D detector VANTEC-500 (manufactured by Bruker Japan)
Voltage: 50 kV
Current: 100 mA
Camera length: 100 mm
Measurement method: Reflection method
Accumulation time: 30 minutes or 60 minutes
Wavelength: CuK$\alpha$ ray (K$\alpha$1 and K$\alpha$2 are not separated)
Detector position: $2\theta=10°$
X-ray incident angle: $\theta=0.3°$
Conditions for one-dimensionalization in $2\theta$ direction: $2\theta=0$ to $35°$, azimuth (chi)$=-95$ to $-85°$
One-dimensionalization in azimuth direction: azimuth (chi)$=-180$ to $0°$ In one-dimensionalization in the azimuth direction, one-dimensionalization is performed in the azimuth direction in the range of $1.0°$ so that the peak of the strongest diffraction intensity is contained in the range of $2\theta=2$ to $15°$. In this procedure, if a peak is observed in the range of azimuth angle $-180$ to $0°$, it is determined that the diffraction peak is observed in the range of $2\theta=2$ to $15°$. For example, in the case of observation of a diffraction peak at $2\theta=6.8°$, when one-dimensionalization is performed in the azimuth direction in the range of $2\theta=6.0$ to $7.0°$, if a peak is observed in the range of azimuth angle $-180$ to $0°$, it may be determined that the diffraction peak is observed in the range of $2\theta=2$ to $15°$.

As the sample used in the wide angle X-ray diffraction, the EVOH resin composition formed into a film described later may be used as it is. Further, when the film of the EVOH resin composition is laminated with another base material, and when the EVOH resin composition layer can be peeled off, the EVOH resin composition layer may be peeled for measurement, while when the layer cannot be peeled, the measurement may be performed while being laminated with another base material. At the time of measurement, the thickness of the peeled EVOH resin composition layer (film) is preferably not less than 30 μm, and if the thickness of the film is insufficient, the films may be laminated.

Hereinafter, EVOH contained in the EVOH resin composition of the present disclosure will be described.

[EVOH]

The EVOH is usually a resin obtained by saponifying an ethylene-vinyl ester-based copolymer, which is a copolymer of ethylene and a vinyl ester-based monomer, and is a water-insoluble thermoplastic resin. As the vinyl ester-based monomer, vinyl acetate is generally used from the economical point of view.

The polymerization method of ethylene and a vinyl ester-based monomer can be carried out by using any known polymerization methods, for example, solution polymerization, suspension polymerization, and emulsion polymerization, and generally, solution polymerization using methanol as a solvent is used. Saponification of the resultant ethylene-vinyl ester-based copolymer can also be carried out in a known manner.

The EVOH produced in this manner is mainly composed of an ethylene-derived structural unit and a vinyl alcohol structural unit, and usually contains a small amount of a vinyl ester structural unit that remains without saponification.

As the vinyl ester-based monomer, vinyl acetate is typically used because of its good marketability and high efficiency of impurity treatment during production. Examples of other vinyl ester-based monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, vinyl versatate and the like, and aromatic vinyl esters such as vinyl benzoate and the like, and usually, aliphatic vinyl esters having 3 to 20 carbon atoms, preferably 4 to 10 carbon atoms, and particularly preferably 4 to 7 carbon atoms can be used. These can be used alone or in combination of two or more.

The content of the ethylene structural unit in EVOH can be controlled by the pressure of ethylene at the time of copolymerizing a vinyl ester-based monomer and ethylene, and is usually 20 to 60 mol %, preferably 25 to 50 mol %, particularly preferably 25 to 35 mol %. If the content is too low, the gas barrier property and melt moldability in a high humidity environment tend to lower, while if the content is too high, the gas barrier property tends to lower.

The content of the ethylene structural unit can be measured based on ISO14663.

Further, the degree of saponification of the vinyl ester component in EVOH can be controlled by the amount of a saponification catalyst (usually, an alkaline catalyst such as sodium hydroxide or the like is used), temperature, time and the like when saponifying the ethylene-vinyl ester copolymer, and is usually 90 to 100 mol %, preferably 95 to 100 mol %, particularly preferably 99 to 100 mol %. If the saponification degree is too low, the gas barrier property, thermal stability, moisture resistance and the like tend to deteriorate.

The degree of saponification of EVOH can be measured based on JIS K6726 (where, EVOH is used as a solution uniformly dissolved in a water/methanol solvent).

The melt flow rate (MFR) ($210°$ C., load 2160 g) of EVOH is usually 0.5 to 100 g/10 minutes, preferably 1 to 50 g/10 minutes, particularly preferably 3 to 35 g/10 minutes. If the MFR is too large, the film-forming property tends to be unstable, and if it is too small, the viscosity tends to be too high and melt extrusion tends to become difficult.

Such MFR is intended as an index of the degree of polymerization of EVOH, and can be adjusted by the amount of a polymerization initiator upon copolymerization of ethylene and a vinyl ester-based monomer, and the amount of the solvent.

In addition, structural units derived from comonomers shown below may be further contained in EVOH, as long as the effects of the present disclosure are not impaired (for example, not higher than 10 mol % of EVOH).

Examples of the comonomer include olefins such as propylene, 1-butene, isobutene and the like; hydroxy group-containing α-olefins such as 3-butene-1-ol, 3-butene-1,2-diol, 4-penten-1-ol, 5-hexene-1,2-diol and the like, and derivatives thereof such as esterified products, acylated products and the like; hydroxyalkyl vinylidenes such as 2-methylenepropane-1,3-diol, 3-methylenepentane-1,5-diol and the like; hydroxyalkyl vinylidene diacetates such as 1,3-diacetoxy-2-methylenepropane, 1,3-dipropionyloxy-2-methylenepropane, 1,3-dibutyryloxy-2-methylenepropane and the like; unsaturated acids such as acrylic acid, methacrylic acids, crotonic acid, (anhydrous) phthalic acid, (anhydrous) maleic acid, (anhydrous) itaconic acid and the like or salts thereof or mono- or dialkyl esters having 1 to 18 carbon atoms in the alkyl group; acrylamides such as acrylamide, N-alkylacrylamides having 1 to 18 carbon atoms in the alkyl group, N,N-dimethylacrylamide, 2-acrylamide propane sulfonic acid or salts thereof, acrylamide propyl dimethylamine or salts or quaternary salts thereof and the like; methacrylamides such as metacrylamide, N-alkylmethacrylamides having 1 to 18 carbon atoms in the alkyl group, N,N-dimethylmethacrylamide, 2-methacrylamide propanesulfonic acid or salts thereof, methacrylamidepropyldimethylamine or salts or quaternary salts thereof and the like; N-vinylamides such as N-vinylpyrrolidone, N-vinylformamide, N-vinylacetamide and the like; vinyl cyanides such as acrylonitrile, methacrylonitrile and the like; vinyl ethers such as alkylvinyl ethers having 1 to 18 carbon atoms in the alkyl group, hydroxyalkyl vinyl ethers, alkoxyalkyl vinyl ethers and the like; halogenated vinyl compounds such as vinyl chloride, vinylidene chloride, vinyl fluoride, vinylidene fluoride, vinyl bromide and the like; vinyl silanes such as trimethoxy vinyl silane and the like; halogenated allyl compounds such as allyl acetate, allyl chloride and the like; allyl alcohols such as allyl alcohol, dimethoxy allyl alcohol and the like; and comonomers such as trimethyl-(3-acrylamide-3-dimethylpropyl)-ammonium chloride, acrylamide-2-methylpropane sulfonic acid and the like. These can be used alone or in combination of two or more.

In particular, EVOH having a primary hydroxyl group in the side chain is preferable in that the secondary moldability is improved while maintaining the gas barrier property, and among them, EVOH obtained by copolymerizing a hydroxy group-containing α-olefin is preferable, and particularly, EVOH having a 1,2-diol structure in the side chain is preferred.

In particular, in the case of EVOH having a primary hydroxyl group in the side chain, the content of the structural unit derived from the monomer having a primary hydroxyl group is usually 0.1 to 20 mol %, further 0.5 to 15 mol %, particular preferably 1 to 10 mol % of EVOH.

Further, the EVOH used in the present disclosure may be subjected to "post-modification" such as urethanization, acetalization, cyanoethylation, oxyalkylenization, acylation and the like.

Furthermore, EVOH for use in the present disclosure may be a mixture with other different EVOH, and such other EVOHs include those having different degrees of saponification, those having different degrees of polymerization, those having different copolymerization components, and the like.

The EVOH is preferably the main component of the EVOH resin composition, and the content of EVOH with respect to the whole EVOH resin composition is usually not less than 80 wt. %, preferably not less than 90 wt. %, particularly preferably not less than 95 wt. %. The upper limit thereof is usually 99.99 wt. %.

As described above, the EVOH resin composition of the present disclosure contains the above EVOH and metal compound, and has a peak of X-ray diffraction at 2θ=2 to 15° when measured by wide-angle X-ray diffraction using CuKα ray.

[Metal Compound]

The metal compound preferably has a structure in which a specific structural unit is layered at specific surface spacing, and is particularly preferably a metal-containing layer compound. Further, the metal compound preferably does not have an oxo ligand. When the metal compound has an oxo ligand, the interaction with EVOH is weakened, and there is a tendency that a sufficient gas barrier property cannot be obtained.

Examples of the metal species contained in the metal compound include Na, K, Ca, Ti, Cr, Mn, Fe, Co, Ni, Cu, Zn and the like. These metal species may be contained alone or in combination of two or more. Of these, Ni, Co, and Zn are particularly preferable, and Zn is particularly preferable, because they are excellent in an oxygen barrier property in a high humidity environment.

Note that the metal compound used in the present disclosure excludes general clay minerals such as, for example, gibbsite, kaolinite, illite/mica, smectite, vermiculite, chlorite, iron compounds, quartz, amorphous minerals, carbonate minerals and the like.

The interlayer distance (distance between layers) of the metal-containing layer compound is preferably 0.01 to 50 nm, more preferably 0.1 to 30 nm, from the viewpoint of interaction with EVOH molecules and water molecules. The interlayer distance of the metal-containing layer compound can be calculated according to the equation of Bragg based on the diffraction position of the peak with the strongest intensity in the range of 2θ=2 to 15° when analyzed by X-ray diffraction method.

The molecular weight of the layer structural unit peeled from the metal-containing layer compound is preferably 100 to 10,000, particularly preferably 200 to 2,000, from the viewpoint that interaction of EVOH is possible at the molecular level.

Further, the layer structural unit is preferably hydrophilic from the viewpoint of interaction with the molecule of EVOH.

Further, it is preferable that the layer structural unit does not decompose even if it is allowed to stand still for 1,000 hours in an environment of 20° C. and 90% RH.

The amount of the metal compound contained in the EVOH resin composition on a metal basis is usually 0.01 to 10 parts by weight, preferably 0.05 to 8 parts by weight, particularly preferably 0.1 to 5 parts by weight, especially preferably 0.2 to 3 parts by weight, based on 100 parts by weight of EVOH. When the content of the metal compound is too small, there is a tendency that the oxygen barrier property in a high humidity environment is lowered, while when the content of the metal compound is too high, there is a tendency that whitening occurs and transparency lowers when formed into a film.

In the case where the EVOH resin composition contains multiple metal compounds of different metal species, the total content of all metal compounds contained in the EVOH resin composition is taken as the content.

The content of the metal compound can be determined by a standard addition method using ICP-MS.

The EVOH resin composition of the present disclosure can be prepared by, for example, (I) a method of reacting a metal-containing compound with a base in a solution in which EVOH is dissolved, (II) a method of heating a metal-containing compound to react in a solution in which EVOH is dissolved, (III) a method of mixing EVOH with a metal compound obtained by previously reacting a metal-containing compound and a base; or other methods.

Examples of the metal species contained in the metal-containing compound include the metal species described for the metal compound, and of them, Ni, Co, and Zn are preferable, and Zn is more preferable.

Examples of the metal-containing compound include organic acid metal salts, inorganic metal salts and the like. Of these, organic acid metal salts are preferable from the viewpoint of reactivity.

Organic acids constituting the organic acid metal salts include, for example, acetic acid, monovalent carboxylic acids such as hydroxyalkylcarboxylic acids having 2 to 20 carbon atoms in the alkyl group, divalent carboxylic acids such as succinic acid, oxalic acid, tartaric acid, and the like, trivalent or higher carboxylic acids such as citric acid, ethylenediamine tetraacetic acid, and the like. These may be used alone or in combination of two or more. Further, the organic acid metal salt may be a hydrate or an anhydride.

As the organic acid metal salt, monovalent carboxylic acid metal salts are preferable, acetic acid metal salts and hydroxyalkylcarboxylic acid metal salts having 2 to 20 carbon atoms in the alkyl group are more preferable, zinc acetate and hydroxyalkylcarboxylic acid zinc salts having 2 to 20 carbon atoms in the alkyl group are particularly preferable, and zinc acetate and hydroxyalkylcarboxylic acid zinc salts having 2 to 8 carbon atoms in the alkyl group and hydrates thereof are further preferable, because of an excellent oxygen barrier property in a high humidity environment.

Examples of the inorganic metal salt include metal fluorides, chlorides, bromides, iodides, and oxo acids. These may be used alone or in combination of two or more. Further, the inorganic metal salt may be a hydrate or an anhydride.

Among them, metal chlorides and oxo acids are preferable, zinc chloride and zinc nitrate or hydrates thereof are particularly preferable, as the inorganic metal salts, from the viewpoint of an excellent oxygen barrier property in a high humidity environment.

Hereinafter, each method for preparing the EVOH resin composition will be described in detail.

[Method (I)]

The method (I) described above is a method of reacting a metal-containing compound with a base in a solution in which EVOH is dissolved.

Examples of the base used in the above method (I) include hydroxides of alkali metals or alkaline earth metals. Of these, alkali metal hydroxides are preferable, and sodium hydroxide is particularly preferable, because they are excellent in reactivity with the metal-containing compound.

In the reaction between the metal-containing compound and the basic, usually, the metal-containing compound and the base may be mixed and reacted in a solution in which EVOH is dissolved.

The method for mixing the metal-containing compound and the base is not particularly limited, and includes, for example, a method of mixing a solution in which the metal-containing compound is dissolved and a solution in which the base is dissolved, and a method of mixing a slurry in which the metal-containing compound is dispersed and a solution in which the base is dissolved. Further, EVOH may be dissolved in at least one of a solution in which the metal-containing compound is dissolved, a slurry in which the metal-containing compound is dispersed, and a solution in which the base is dissolved. Among the above methods, a method of mixing a solution in which the metal-containing compound is dissolved and a solution in which the base is dissolved is preferable from the viewpoint of reaction efficiency. Furthermore, when an organic acid metal salt is used as the metal-containing compound, a method of adding and mixing a solution in which an organic acid metal salt is dissolved to a solution in which a base is dissolved is preferable, and when an inorganic metal salt is used, a method of adding and mixing a solution in which a base is dissolved to a solution in which an inorganic metal salt is dissolved is preferable.

The solvent for dissolving or dispersing the EVOH, the metal-containing compound and the base is not particularly limited, and includes, for example, water, and lower alcohols having 1 to 5 carbon atoms such as methanol, ethanol, 1-propanol, 2-propanol, 1-butanol, 2-butanol and the like. These may be used alone or in combination of two or more. Of these, water and alcohols are preferable, and a mixed solvent of water and 1-propanol is particularly preferable.

The concentration of the metal-containing compound in the solution in which the metal-containing compound is dissolved or the slurry in which the metal-containing compound is dispersed is usually 0.01 to 3 mol/L, preferably 0.05 to 2 mol/L.

The concentration of the base in the solution in which the base is dissolved is usually 0.01 to 100 mol/L, preferably 0.05 to 30 mol/L, and particularly preferably 0.1 to 10 mol/L.

If the concentrations of the metal-containing compound and the base are too lower than the above range, the reaction tends not to proceed sufficiently. Further, if the concentrations of the metal-containing compound and the base are too higher than the above range, a side reaction tends to occur.

The molar ratio of the metal-containing compound to the base (metal-containing compound:base) is usually 0.5:2 to 2:0.5, preferably 0.8:1.8 to 1.8:0.8, particularly preferably 0.9:1.5 to 1:1. If the molar ratio is out of the above range, the reaction tends not to proceed sufficiently.

The pH at the time of reacting the metal-containing compound with the base is usually 4 to 9, preferably 5 to 8. If the pH is too low below the above range, the reaction tends not to proceed sufficiently. Further, if the pH is too high than the above range, there is a tendency that the EVOH resin composition of the present disclosure is no obtained. The pH is adjusted by the amounts of the solution in which the metal-containing compound is dissolved or the slurry in which the metal-containing compound is dispersed and the solution in which the base is dissolved.

The reaction temperature in the above reaction is usually 15 to 60° C., preferably 20 to 40° C. If the reaction temperature is too low, the reaction tends not to proceed sufficiently, and if the reaction temperature is too high, the metal-containing compound tends to be decomposed by heat, and the EVOH resin composition of the present disclosure tends not to be obtained.

The reaction time is usually 0.5 to 100 hours, preferably 1 to 70 hours, and the pressure at the time of reaction may be normal pressure.

[Method (II)]

The above method (II) is a method of heating a metal-containing compound to react in a solution in which EVOH is dissolved.

The above method (II) is usually carried out by further dissolving the metal-containing compound in a solution in which EVOH is dissolved, and heating this with stirring.

As the solvent for dissolving the EVOH and the metal-containing compound, the solvents listed in the method (I) above can be used. Of these, water and alcohols are preferable, and a mixed solvent of water and 1-propanol is particularly preferable.

As the heating conditions, the temperature of the solution is usually 20 to 100° C., preferably 50 to 95° C., particularly preferably 70 to 90° C. If the reaction temperature is too low, the reaction tends not to proceed sufficiently, and if the reaction temperature is too high, the metal-containing compound tends to be decomposed by heat, and the EVOH resin composition of the present disclosure tends not to be obtained.

The reaction time is usually 0.1 to 100 hours, preferably 0.5 to 30 hours, particularly preferably 1 to 10 hours, and the pressure at the time of reaction may be normal pressure.

[Method (III)]

The method (III) above is a method of mixing EVOH with a metal compound obtained by previously reacting a metal-containing compound and a base.

Examples of the base used in the above method (III) include hydroxides of alkali metals or alkaline earth metals. Among them, in terms of excellent reactivity with the metal-containing compounds, hydroxides of alkali metals are preferred, and sodium hydroxide is particularly preferable.

In the reaction between the metal-containing compound and the base, usually, the metal-containing compound and the base may be mixed and reacted in a solution.

The method for mixing the metal-containing compound and the base is not particularly limited, and includes, for example, a method of mixing a solution in which the metal-containing compound is dissolved and a solution in which the base is dissolved, and a method of mixing a slurry in which the metal-containing compound is dispersed and a solution in which the base is dissolved. Among the above methods, a method of mixing a solution in which the metal-containing compound is dissolved and a solution in which the base is dissolved is preferable from the viewpoint of reaction efficiency. Furthermore, when an organic acid metal salt is used as the metal-containing compound, a method of adding and mixing a solution in which an organic acid metal salt is dissolved to a solution in which a base is dissolved is preferable, and when an inorganic metal salt is used, a method of adding and mixing a solution in which a base is dissolved to a solution in which an inorganic metal salt is dissolved is preferable.

As the solvent for dissolving the metal-containing compound and the base, the solvents listed in the method (I) above can be used. Of these, water is preferable because it is easy to post-treat.

The concentration of the metal-containing compound in the solution dissolving the metal-containing compound is usually 0.01 to 3 mol/L, preferably 0.05 to 2 mol/L.

The concentration of the base in the solution in which the base is dissolved in a solvent is usually 0.01 to 100 mol/L, preferably 0.05 to 30 mol/L, particularly preferably 0.1 to 10 mol/L.

If the concentrations of the metal-containing compound and the base are too lower than the above range, the reaction tends not to proceed sufficiently. Further, if the concentrations of the metal-containing compound and the base are too high above the above range, a side reaction tends to occur.

The molar ratio of the metal-containing compound to the base (metal-containing compound:base) is usually from 0.5:2 to 2:0.5, preferably 0.8:1.8 to 1.8:0.8, particularly preferably 0.9:1.5 to 1:1. If the molar ratio is out of the above range, the reaction tends not to proceed sufficiently.

The pH during the reaction of the metal-containing compound with the base is usually 4 to 9, preferably 5 to 8. If the pH is too low below the above range, the reaction tends not to proceed sufficiently. If the pH is too high above the above range, the produced metal compound tends to be decomposed. The pH may be adjusted by using a solution in which a metal-containing compound is dissolved or a solution in which a base is dissolved.

The reaction temperature in the above reaction is usually 15 to 60° C., preferably 20 to 40° C. If the reaction temperature is too low, the reaction tends not to proceed sufficiently, and if the reaction temperature is too high, the metal-containing compound tends to be decomposed by heat and the desired metal compound tends not to be obtained.

The reaction time is usually 0.5 to 100 hours, preferably 1 to 70 hours, and the pressure at the time of reaction may be normal pressure.

After the above reaction, a metal compound is obtained as a precipitate. The obtained metal compound may be used as it is, but it is preferable to purify the metal compound by washing, pulverizing or the like.

The method for mixing the metal compound obtained above with EVOH is not particularly limited, and known methods can be adopted. Among them, it is preferable to add a metal compound to the solution in which EVOH is dissolved and stir under reflux from the viewpoint of a mixing property. As the solvent for dissolving EVOH, the solvents listed in the method (I) above can be used. Of these, a mixed solvent of water and 1-propanol is preferable.

The EVOH resin composition of the present disclosure containing EVOH and a metal compound and having a peak of X-ray diffraction at $2\theta=2$ to $15°$ when measured by wide-angle X-ray diffraction using $CuK\alpha$ ray can be prepared by each of the above methods. Of these, the method (II) is preferable from the viewpoint of operability. Further, the EVOH resin composition prepared by each of the above methods may be used in a solution state, or may be used as pellets or the like by known methods.

[Other Components]

The EVOH resin composition of the present disclosure may contain blending agents generally blended in the EVOH resin composition, for example, heat stabilizers, antioxidants, antistatic agents, colorants, UV absorbers, lubricants, plasticizers, light stabilizers, surfactants, antibacterial agents, desiccants, antiblocking agents, flame retardants, cross-linking agents, hardeners, foaming agents, crystal nucleating agents, anti-fog agents, biodegradation additives, silane coupling agents, oxygen absorbers and the like, as long as the effect of the present disclosure is not impaired. These can be used alone or in combination of two or more.

<Film Containing EVOH Resin Composition>

The film containing the EVOH resin composition of the present disclosure is obtained by forming a film of the composition containing the EVOH resin composition, and is preferably obtained by forming a film of the EVOH resin composition.

The method for forming the film includes, for example, a method using a solution (coating liquid) of a composition containing an EVOH resin composition, a method for melt-molding a pellet-shaped composition containing the EVOH resin composition of the present disclosure using an extruder, and the like. Of these, a method using a solution (coating liquid) of a composition containing an EVOH resin composition is preferable.

As the coating liquid, usually, the solution of the EVOH resin composition prepared by the above method may be used as it is, or the solid content concentration may be adjusted before use as necessary.

The solid content concentration of the coating liquid is usually 0.5 to 30 wt. %, preferably 5 to 20 wt. %. The solvents listed in the method for preparing the EVOH resin composition may be used for adjusting the solid content concentration.

As the film forming method, for example, known methods such as a melt extrusion method or a casting method and a method by coating, and the like can be adopted. Of these, the coating method is preferable.

Examples of the coating method include known methods such as bar coating, roll coating, die coating, gravure coating, comma coating, screen printing and the like.

After coating, a film composed of an EVOH resin composition can be obtained by, for example, drying at 60 to 105° C. for 0.5 to 10 minutes by a heat treatment or the like. Further, the film may be subjected to stretching operations such as uniaxial stretching and biaxial stretching, if necessary.

The film may be a single layer structure or a multilayer structure. Further, it is preferable that the multilayer structure has at least one layer composed of the above film. Further, the multilayer structure may be laminated with a film-formed film or may be laminated with another base resin.

The thickness of the film is usually 1 to 200 μm, preferably 1 to 100 μm, particularly preferably 1 to 50 μm. In the case where the film-formed film has a multilayer structure, the sum of the thicknesses of all films composed of the EVOH resin composition is taken as the thickness of the film.

Examples of the base resin include polyethylene-based resins such as linear low-density polyethylene, low-density polyethylene, ultra-low-density polyethylene, medium-density polyethylene, high-density polyethylene, ethylene-propylene (block and random) copolymers, ethylene-α-olefin (α-olefins having 4 to 20 carbon atoms) copolymers, and the like; polypropylene-based resins such as polypropylene, propylene-α-olefin (α-olefins having 4 to 20 carbon atoms) copolymers and the like; (unmodified) polyolefin-based resins such as polybutene, polypentene, polycyclic olefin-based resins (polymers having a cyclic olefin structure in at least one of the main chain and side chains) and the like; broad sense polyolefin-based resins containing a modified olefin-based resins such as unsaturated carboxylic acid-modified polyolefin-based resins obtained by graft-modifying these polyolefins with an unsaturated carboxylic acid or its ester; ionomers, ethylene-vinyl acetate copolymers, ethylene-acrylic acid copolymers, ethylene-acrylic acid ester copolymers, polyester-based resins, polyamide-based resins (including also copolymerized polyamide), polyvinyl chloride, polyvinylidene chloride, acrylic resins, polystyrene, vinyl ester-based resins, polyester-based elastomers, polyurethane-based elastomers, polystyrene-based elastomers, halogenated polyolefins such as polyethylene chloride, polypropylene chloride and the like; aromatic or aliphatic polyketones, and the like. These may be used alone or in combination of two or more. Further, these base resins may be subjected to surface treatments such as a corona treatment.

The film composed of the EVOH resin composition of the present disclosure has an excellent gas barrier property in a high humidity environment, but when this film is allowed to stand still in a high humidity environment, it can be a film having a further excellent gas barrier property, particularly an oxygen barrier property in a high humidity environment, which is preferred. The principle for obtaining such an effect is not clear, but it is presumed that when the film is allowed to stand still in a high humidity environment, the molecules of EVOH are plasticized, and the metal compound dispersed in the film interacts with EVOH, or localizes on the surface of the film.

In the present disclosure, the high humidity environment denotes 20±5° C. and 90±10% RH.

The still-standing time is usually not less than 70 hours, preferably not less than 300 hours, more preferably not less than 500 hours. The upper limit of the still-standing time is usually 1000 hours.

The oxygen permeability of the film composed of the EVOH resin composition is preferably not greater than 15 cc·20 μm/m²·day·atm (cm³·20 μm/m²·day·atm), more preferably not greater than 10 cc·20 μm/m²·day·atm, particularly preferably not greater than 5 cc·20 μm/m²·day·atm. The oxygen permeability is measured in an environment of 20° C. and 90% RH, and the lower limit of the oxygen permeability is usually 0 cc·20 μm/m²·day·atm. Further, the oxygen permeability can be determined by an oxygen permeation rate measuring device.

The EVOH resin composition of the present disclosure and the film composed of the EVOH resin composition are useful as packaging materials, and can be particularly preferably used as packaging materials for foods, pharmaceuticals, and the like.

EXAMPLES

Hereinafter, the present disclosure will be described in more detail with reference to examples, but the present disclosure is not limited to the following examples as long as the gist of the present disclosure is not exceeded. The term "part" below means a weight standard.

Prior to the examples, the following EVOH was prepared.
[Hydrophilic Resin]
EVOH1 (content of ethylene structural unit: 44 mol %, MFR: 3 g/10 min, saponification degree: 99.6 mol %, moisture content: 0.3 wt. %)
EVOH2 (content of ethylene structural unit: 29 mol %, MFR: 4 g/10 min, saponification degree: 99.6 mol %, moisture content: 0.3 wt. %)
EVOH3 (content of ethylene structural unit: 25 mol %, MFR: 4 g/10 min, saponification degree: 99.6 mol %, moisture content: 0.3 wt. %)

Example 1

To 45 parts of water/1-propanol=4/6 (volume ratio) mixed solvent was added 5 parts of EVOH1, and zinc acetate dihydrate (manufactured by Fujifilm Wako Pure Chemical corp.) was added in an amount of 1.0 part in terms of metal to EVOH, and the mixture was stirred with heating at 87° C. (under reflux) for 2 hours, to obtain an EVOH resin composition containing a metal compound obtained by reacting zinc acetate dihydrate (reaction product of zinc acetate). This solution was allowed to cool to 55° C. to prepare a coating solution. The resultant coating solution was applied using a wire bar #24 to the corona-treated surface of a PET substrate having a thickness of 12 μm treated with corona, and dried for 5 minutes at 80° C. By performing this process twice, a two-layer film in which the film layer having a thickness of 6 μm was laminated on the PET substrate was obtained. The resultant film was allowed to stand still for 600 hours under humidity control conditions of 20° C. and 90% RH, to prepare a film.

Example 2

A film was made in the same manner as in Example 1 except that the volume ratio of water/1-propanol of the mixed solvent used was changed to 1/1 and EVOH1 was replaced by EVOH2, and the film was prepared under the same humidity control conditions.

Example 3

[Synthesis of Zinc Hydroxyalkylcarboxylate Reaction Product]

One hundred (100) parts of a 0.79 mol/L 6-hexanolactone-methanol solution was added dropwise to 200 parts of a 0.39 mol/L sodium hydroxide-methanol solution, and the mixture was stirred at 67° C. for 5 hours for reaction. Then, after allowing to cool to 24° C., 100 parts of a 0.79 mol/L zinc nitrate-methanol solution was added dropwise, and the mixture was stirred at 24° C. for 3 days for reaction. The reaction solution after the reaction was separated into a precipitate and a filtrate by vacuum filtration, the solvent contained in the filtrate was removed by an evaporator, and then 40 parts of water was added to the precipitated solid and cooled to 4° C. The undissolved white solid was filtered off under reduced pressure. Then, cold water was added to the white solid obtained as a residue, the mixture was stirred, and filtrated again, to wash the white solid. Finally, the filtered white solid was dried under atmospheric pressure at 60° C. for 2 days, to obtain zinc hydroxyalkylcarboxylate.

While 0.5 g of the resultant zinc hydroxyalkylcarboxylate was dissolved in 20 parts of water and stirred at 24° C., 20 parts of a 0.12 mol/L sodium hydroxide aqueous solution was slowly added dropwise thereto, and the mixture was stirred at 25° C. for 48 hours for reaction. After the reaction, the deposited white precipitate was filtered off by vacuum filtration. Piston cleaning was performed three times on the white solid obtained as a residue with water and dried at atmospheric pressure at 60° C., to obtain a metal compound (reaction product of zinc hydroxyalkylcarboxylate).

[Formation of Film]

Five parts of EVOH3 was added to 45 parts of a mixed solvent of water/1-propanol=1/1 (volume ratio), and the mixture was heated and stirred at 87° C. for 1 hour to completely dissolve EVOH. This solution was allowed to cool to 55° C., and 0.5 parts of the metal compound (reaction product of zinc hydroxyalkylcarboxylate) in terms of metal obtained above was added to 100 parts of EVOH, to obtain an EVOH resin composition. After stirring this solution at 87° C. (under reflux) for 2 hours, the solution was allowed to cool to 55° C. to prepare a coating solution. The resultant coating solution was applied using a wire bar #24 to the corona-treated surface of a PET substrate having a thickness of 12 μm treated with corona, and dried for 5 minutes at 80° C. By performing this process twice, a two-layer film in which the film layer having a thickness of 6 μm was laminated on the PET substrate was obtained. The resultant film was allowed to stand still for 533 hours under humidity control conditions of 20° C. and 90% RH, to prepare a film.

Comparative Example 1

Five parts of EVOH3 was added to 45 parts of a mixed solvent of water/1-propanol=1/1 (volume ratio), and the mixture was heated and stirred at 87° C. for 1 hour, to completely dissolve EVOH. This solution was allowed to cool to 55° C., and 0.1 parts of zinc oxide (manufactured by Fujifilm Wako Pure Chemical corp.) in terms of metal was added to 100 parts of EVOH, and the mixture was stirred for 2 hours still at 55° C., to prepare an EVOH resin composition (coating solution). From the resultant coating solution, a film was made by the same method as in Example 1, and prepared under the same humidity control conditions.

Comparative Example 2

A film was made by the same method as in Example 1 except that zinc acetate dihydrate was not added in Example 1, and a film was prepared under the same humidity control conditions.

Comparative Example 3

A film was made in the same manner as in Example 2 except that zinc acetate dihydrate was not added in Example 2, and prepared under the same humidity control conditions.

Using the films of Examples 1 to 3 and Comparative Examples 1 to 3 obtained above, wide-angle X-ray diffraction and a gas barrier property were measured under the following conditions. The results are shown in Table 1 below.

[Measurement of Wide-Angle X-Ray Diffraction (XRD) of Film]

The EVOH resin composition film obtained above was peeled off from the PET film and laminated so as to have a thickness of not less than 30 μm to prepare a sample.

Measurement of wide-angle X-ray diffraction of this sample was performed under the following conditions.

[Measurement Conditions]
  Equipment used: D8 DISCOVER (manufactured by Bruker Japan)
  Detector: 2D detector VANTEC-500 (manufactured by Bruker Japan)
  Voltage: 50 kV
  Current: 100 mA
  Camera length: 100 mm
  Measurement method: reflection method
  Accumulation time: 30 minutes for Examples 1 and 2 and Comparative Examples 1 to 3, 60 minutes for Example 3
  Wavelength: CuKα ray (Kα1 and Kα2 are not separated)
  Detector position: 2θ=10°
  X-ray incident angle: θ=0.3°
  Conditions for one-dimensionalization in 2θ direction: 2θ=0 to 35°, azimuth (chi)=−95 to −85°
  One-dimensionalization in azimuth direction: In Examples 1 and 2, 2θ=6.0 to 7.0°, azimuth (chi)=−180 to 0°

After the X-ray diffraction measurement, the resultant diffraction image was one-dimensionalized in the range of −180 to 0° in the azimuth direction in the range of 2θ=6.0 to 7.0°, and the azimuth dependence of the diffraction intensity was determined. At this time, if a diffraction peak was observed at an azimuth angle of −90°, it was determined that the EVOH resin composition had a diffraction peak at 2θ=6.0 to 7.0°.

Further, in Example 3, after the X-ray diffraction measurement at 2θ=3.5 to 4.5° and azimuth (chi)=−180 to 0°, the resultant diffraction image was one-dimensionalized in the range of −180 to 0° in the azimuth direction in the range of 2θ=3.5 to 4.5°, and the azimuth dependence of the diffraction intensity was confirmed. At this time, if a diffraction peak was observed at an azimuth angle of −90°, it was determined that the EVOH resin composition had a diffraction peak at 2θ=3.5 to 4.5°.

[Gas Barrier Property]

The oxygen permeability of the resultant EVOH resin composition film was measured using an oxygen permeability measuring device (OX-TRAN100A, manufactured by MOCON) under the conditions of 20° C. and 90% RH.

As can be seen from Table 1 above, the EVOH resin compositions of Examples 1 to 3 containing EVOH and a metal compound and having a peak on the low angle side (2θ=2 to 15°) in the measurement of wide-angle X-ray diffraction had an excellent oxygen barrier property in a high humidity environment.

On the other hand, the EVOH resin composition of Comparative Example 1 and the EVOH resin compositions of Comparative Examples 2 and 3 which did not have a peak on the low angle side in the measurement of wide-angle X-ray diffraction were all inferior in an oxygen barrier property.

Although the specific embodiments of the present disclosure have been shown in the above examples, the above examples are merely examples and are not to be construed in a limited manner. Various variations apparent to those skilled in the art are intended to be within the scope of the present disclosure.

The EVOH resin composition of the present disclosure is excellent in a gas barrier property, particularly an oxygen barrier property in a high humidity environment, thus, the composition is useful as packaging materials, and can be particularly suitably used as packaging materials for foods and pharmaceutical products.

The invention claimed is:

1. An ethylene-vinyl alcohol copolymer resin composition, comprising:
   an ethylene-vinyl alcohol copolymer, and
   a metal compound,
   wherein the ethylene-vinyl alcohol copolymer resin composition has a peak of X-ray diffraction at 2θ=2 to 15° when measured by wide-angle X-ray diffraction using CuKα ray.

2. The ethylene-vinyl alcohol copolymer resin composition according to claim 1, wherein the metal compound is present in an amount of 0.01 to 10 parts by weight on a metal basis based on 100 parts by weight of the ethylene-vinyl alcohol copolymer.

3. The ethylene-vinyl alcohol copolymer resin composition according to claim 1, wherein the metal compound comprises at least one metal selected from Zn, Co, and Ni.

TABLE 1

| | | Metal compound | | Film humidity | | Gas barrier |
| | | | Amount on metal basis[X1] | control time | X-ray diffraction | property (cc · 20 μm/ |
| | EVOH | Kinds | (part) | (hour) | 2θ | m2 · day · atm) |
| --- | --- | --- | --- | --- | --- | --- |
| Example 1 | EVOH1 | Reaction product of zinc acetate | 1.0 | 600 | Peak observation a 6.0 to 7.0° | 6.5 |
| Example 2 | EVOH2 | Reaction product of zinc acetate | 1.0 | 600 | Peak observation a 6.0 to 7.0° | 6.7 |
| Example 3 | EVOH3 | Reaction product of zinc hydroxyalkylcarboxylate | 0.5 | 533 | Peak observation a 3.5 to 4.5° | 5.9 |
| Comparative Example 1 | EVOH3 | ZnO | 0.1 | 600 | none | 24.8 |
| Comparative Example 2 | EVOH1 | — | — | 600 | none | 13.9 |
| Comparative Example 3 | EVOH2 | — | — | 600 | none | 19.7 |

[X1]Amount based on 100 parts of EVOH

4. A film comprising the ethylene-vinyl alcohol copolymer resin composition according to claim 1.

5. The film according to claim 4, wherein the film has an oxygen permeability of not greater than 15 cc·20 μm/m²·day·atm at 20° C. at 90% RH.

6. A multilayer structure having at least one layer comprising the film according to claim 4.

* * * * *